United States Patent [19]

Tanguy et al.

[11] 4,359,898

[45] Nov. 23, 1982

[54] WEIGHT-ON-BIT AND TORQUE MEASURING APPARATUS

[75] Inventors: Denis R. Tanguy, Houston; Larry J. Leising, Rosenberg, both of Tex.

[73] Assignee: Schlumberger Technology Corporation, New York, N.Y.

[21] Appl. No.: 214,472

[22] Filed: Dec. 9, 1980

[51] Int. Cl.³ .................................................. E21B 47/00
[52] U.S. Cl. ................................................................ 73/151
[58] Field of Search ................ 73/151, 862.65, 862.35, 73/862.66, 862.67; 175/40

[56] References Cited

U.S. PATENT DOCUMENTS

| | | | |
|---|---|---|---|
| 3,686,942 | 8/1972 | Chatard et al. | 73/151 |
| 3,855,853 | 12/1974 | Claycomb | 73/151 |
| 3,864,968 | 2/1975 | Anderson | 73/151 |
| 3,929,009 | 12/1975 | Lutz et al. | 73/862.35 |
| 3,968,473 | 7/1976 | Patton et al. | 340/18 LD |
| 4,120,198 | 10/1978 | Tanguy et al. | 73/151 |
| 4,186,596 | 2/1980 | Bohringer et al. | 73/862.35 |

Primary Examiner—Jerry W. Myracle

[57] ABSTRACT

In accordance with an illustrative embodiment of the present invention, a new and improved weight-on-bit and/or torque measuring apparatus for use in making measurements-while-drilling includes a tubular housing adapted to be attached in the drill string above the bit, the housing having diametrically opposed, radially directed holes that are enclosed to provide a sealed chamber isolated from ambient well fluids. The holes have peripheral wall surfaces to which are attached sensors that measure strain induced by axial and/or torsional loading of the housing. The strain sensors are attached to the walls at locations to be substantially insensitive to strains induced by temperature gradients, and an internal sleeve is utilized in combination with pressure equalization to eliminate spurious stresses in the region of the holes caused by pressure differences inside and outside the housing.

20 Claims, 5 Drawing Figures

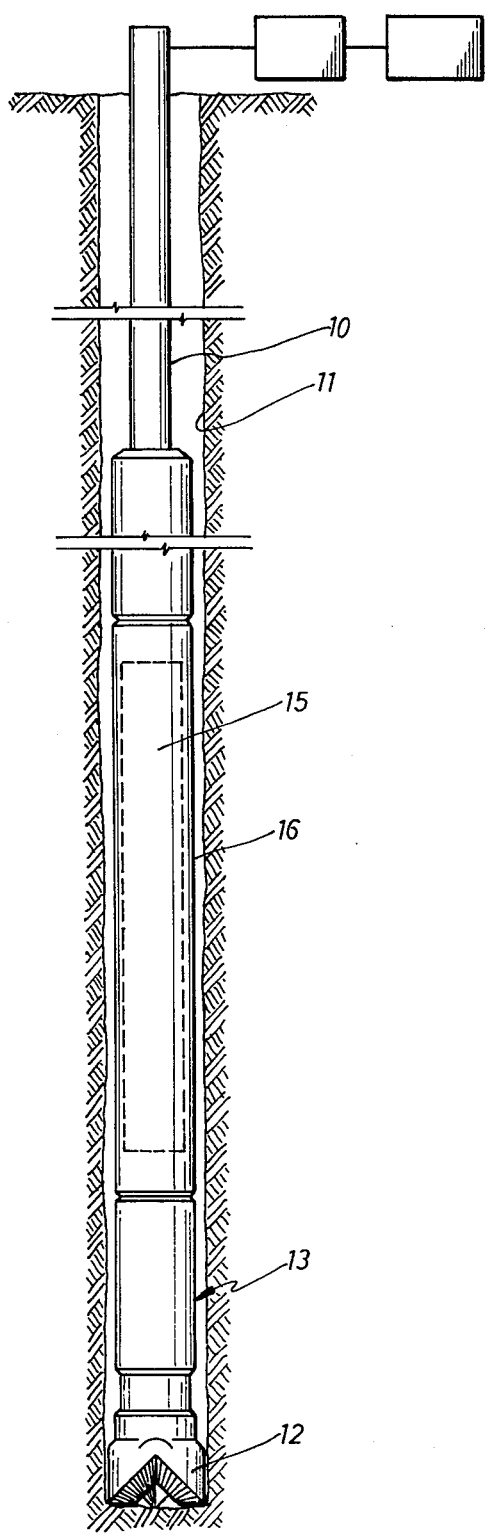
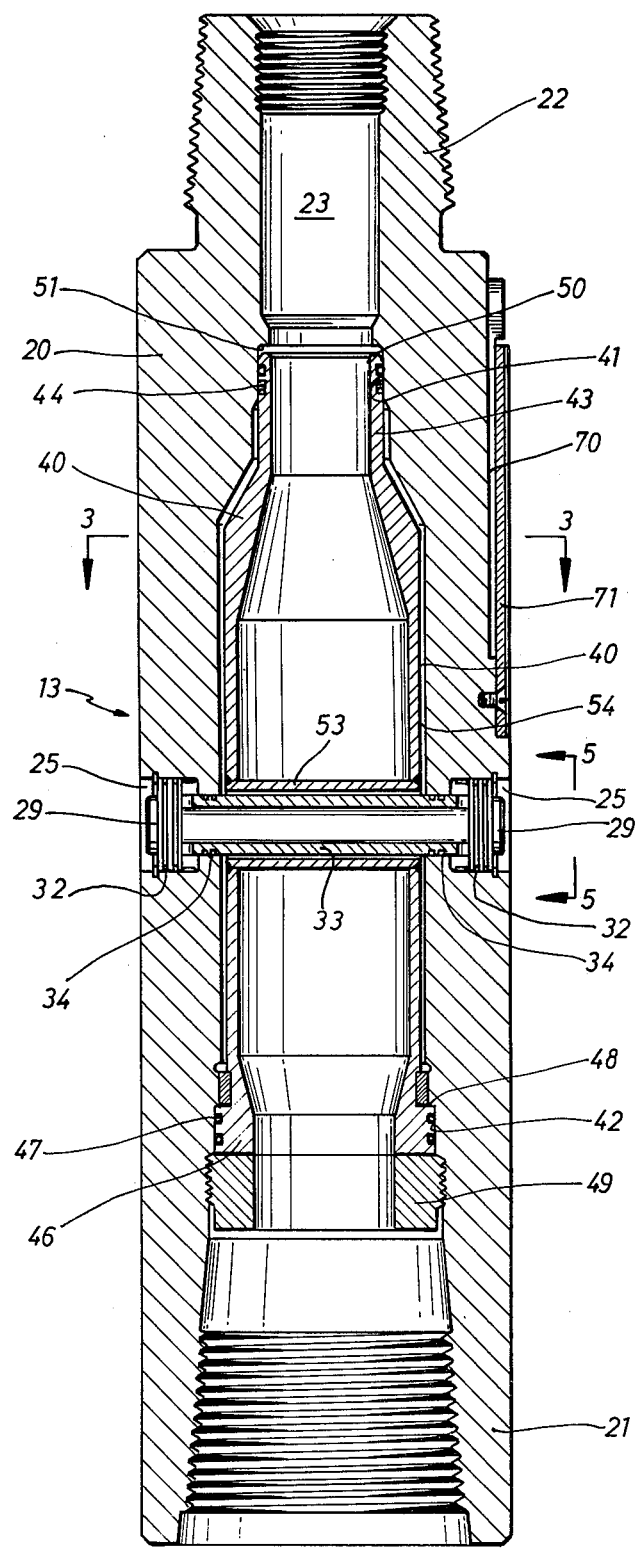

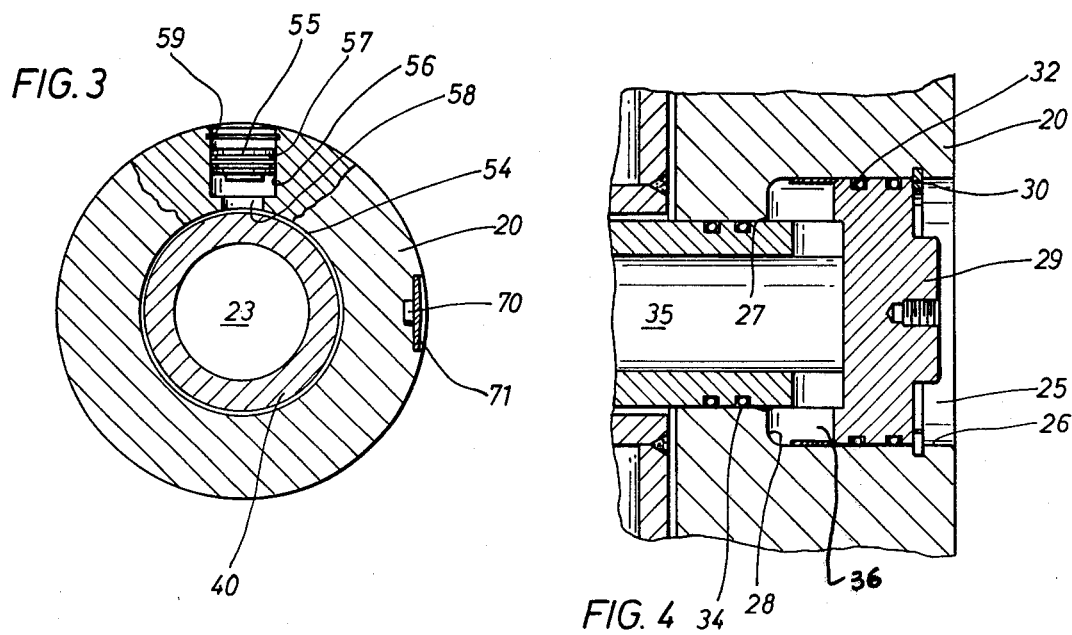
FIG. 3
FIG. 4
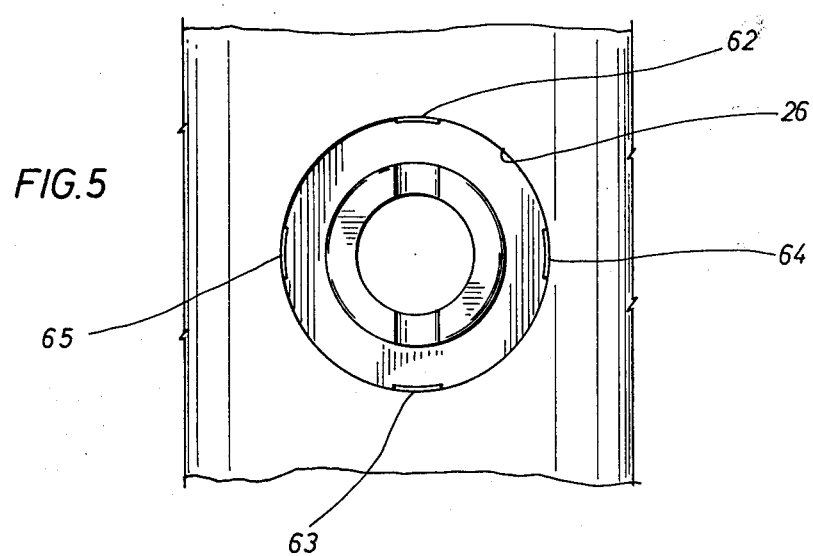
FIG. 5

WEIGHT-ON-BIT AND TORQUE MEASURING APPARATUS

FIELD OF THE INVENTION

This invention relates generally to the making of downhole measurements during the drilling of a well bore, and particularly to a new and improved apparatus for use in measuring parameters such as the amount of weight or torque being applied to the drill bit during the drilling operation.

BACKGROUND OF THE INVENTION

Weight-on-bit (hereinafter WOB) is generally recognized as being an important parameter in controlling the drilling of a well. The weight is applied to the bit by a string of heavy drill collars that is attached immediately above the bit and suspended in the borehole on smaller diameter drill pipe. In conventional drilling practice, the entire length of the drill pipe and an upper portion of the drill collar string are suspended at the surface from the derrick in tension, so that the amount of WOB can be varied by changing the indicated surface hookload. Properly controlled WOB is necessary to optimize the rate that the bit penetrates a particular type of earth formation, as well as the rate of bit wear. WOB also is utilized in controlling the direction of the hole, and accurate measurement thereof can be used in analyzing drilling rate "breaks" indicative of entry of the bit into more porous earth formations. Thus, it will be recognized that a precise and accurate measurement of the WOB parameter on an ongoing basis is extremely important in the drilling process.

Torque also is an important measure useful in estimating the degree of wear of the bit, particularly when considered together with measurements of WOB. Excessive torque is indicative of serious bit damage such as bearing failure and locked cones.

In the past, WOB and torque measurements have been made at the surface, the former by comparing indicated hookload weight to off-bottom weight of the drill string, and the latter by measurement of current supply to the rotary table electric drive motor, or mechanical force on the rotary drive chain idler. However, a surface measurement is not always reliable due to drag of the drill string on the borehole wall, and other factors. As a consequence, there has been a long-felt need to measure actual values of weight and torque at the bit itself to provide truly reliable information.

Recent developments in borehole telemetry systems have made it possible to make the measurements downhole, but for the most part, the downhole sensors that have been proposed are subject to significant inaccuracies due to the effects of well pressures and temperature transients that are present during the drilling process. In particular, those designs using an auxiliary member or sleeve to amplify the strain are believed to be inadequate because such auxiliary member cannot distinguish between strain due to weight and a strain due to thermal expansion, the latter being a very complex, time-dependent distribution of strain that can render the measurements, particular WOB, meaningless.

The general object of the present invention is to provide a new and improved apparatus for measuring WOB and/or torque downhole with high accuracy.

Another object of the present invention is to provide a sensor apparatus of the type described that employs strain gauges to measure axial and torsional forces on the bit in an improved manner.

Still another object of the present invention is to provide a new and improved WOB sub having strain gauge transducer means constructed and arranged to be substantially insensitive to stresses induced by changing temperatures and pressures during the drilling of a well.

SUMMARY OF THE INVENTION

These and other objects are attained in accordance with the principles of the present invention through the provision of measuring apparatus comprising a tubular body adapted to be connected in the drill string adjacent the bit and having diametrically opposed, radially directed apertures formed in the wall thereof to provide stress amplification. The resulting strain due to ovalization of the apertures under compression or torsional loading of the body is measured by a network of resistance strain gauges fixed to walls of the apertures. The gauges are so arranged that they will measure the amplified stress without responding to thermal strain. In particular, the gauges preferably are mounted at or near the radius where the thermal stress is zero, which is near the center of the wall-sectional thickness of the tubular body. The gauges also are mounted in an atmospheric environment, i.e., isolated from ambient well fluid, through use of sealed plugs closing the outer ends of the apertures and held apart by a cross-member having end sections also sealed with respect to a wall surface of each aperture. Hoop stresses in the holes due to hydrostatic pressure are cancelled due to the fact that all gauges are subject to approximately the same hoop stresses. Moreover, to substantially eliminate spurious stresses in the tubular body due to differential pressure, a sleeve is mounted in the bore of the body and extends above and below the apertures and has its opposite ends sealed with respect to the body to provide an annular cavity that is filled with oil or the like. The pressure outside the body is equalized with the pressure of the oil in an appropriate manner. The lower end of the sleeve has an outwardly directed flange which engages a downwardly facing shoulder on the body, with the flange being sealed on a substantially larger internal diameter of the body than the seal between the upper end of the sleeve and the body. In this manner, stresses that would otherwise be present in the body due to pressure drop across the bit are substantially compensated by upward force on the sleeve due to such pressure drop, which is transmitted to the body at the shoulder. The strain gauges may be affixed to walls of the apertures in appropriate orientation to measure either WOB, torque or both values.

BRIEF DESCRIPTION OF THE DRAWINGS

The present invention has other features and advantages which will become more clearly apparent in connection with the following detailed description of a preferred embodiment, taken in conjunction with the appended drawings in which:

FIG. 1 is a schematic illustration of a borehole having a drill string suspended therein which incorporates a sensor apparatus in accordance with the present invention;

FIG. 2 is a longitudinal cross-sectional view of the sensor apparatus;

FIG. 3 is a cross-section taken on line 3—3 of FIG. 2;

FIG. 4 is an enlarged fragmentary cross-sectional view of an aperture assembly to illustrate further structural details therein; and FIG. 5 is an end view of the aperture of FIG. 4 to illustrate placement of strain gauge transducers.

DESCRIPTION OF A PREFERRED EMBODIMENT

Referring initially to FIG. 1, there is shown a drill string 10 suspended in a borehole 11 and having a typical drill bit 12 attached to its lower end. Immediately above the bit 12 is a sensor apparatus 13 constructed in accordance with the present invention. The output of the sensor 13 is fed to a transmitter assembly 15, for example, of the type shown and described in U.S. Pat. No. 3,309,656, Godbey, which is incorporated herein by reference. The transmitter 15 is located and attached within a special drill collar section 16 and functions to provide in the drilling fluid being circulated downwardly within the drill string 10 an acoustic signal that is modulated in accordance with sensed data. The signal is detected at the surface and processed to provide recordable data representative of the downhole measurements. Although an acoustic data transmission system is mentioned herein, other types of telemetry systems, of course, may be employed, provided they are capable of transmitting an intelligible signal from downhole to the surface during the drilling operation.

Referring now to FIG. 2 for a detailed representation of a preferred embodiment of the present invention, the apparatus 13 includes a tubular body 20 having a threaded box 21 at its lower end adapted for connection to the drill bit 12, and a threaded pin 22 at its upper end adapted for connection to the drill collar 16. A central passage 23 provides for the flow of drilling mud toward the bit 12. The body 20 has a pair of radially directed, diametrically opposed, circular holes or apertures 25 through the wall thereof intermediate its ends, with each hole being identical in configuration. As shown in enlarged detail in FIG. 4, each hole has a greater diameter wall surface 26 and a lesser diameter wall surface 27 preferably joined by a rounded surface 28. The outer opening of each hole 25 is closed by a plug 29 that is inserted from the outside and retained by a clip ring 30, and each plug has O-ring seals 32 engaging the wall surface 26 to prevent fluid leakage. A support tube 33 extends transversely of the body 20 with its respective outer ends being in abutting engagement with the rear surfaces of the plugs 29, and has O-ring seals 34 in engagement with the wall surface 27, whereby the interior area 35 of the tube and the annular region 36 behind each plug 29 are maintained at atomspheric pressure and sealed off from ambient well fluids. A circuit board (not shown) may be positioned within the tube 33 and carry various electronic components operatively associated with the strain gauge bridge circuits to be mentioned hereinafter.

Referring again to FIG. 2, a pressure sleeve 40 is mounted within the body 20 and extends from a reduced diameter bore surface 41 of the body to an enlarged diameter bore surface 42 thereof. The upper end portion 43 of the sleeve 40 is correspondingly reduced in diameter and is sealed with respect to the surface 41 by O-rings 44, whereas the lower portion 45 is provided with an outwardly directed flange 46 having O-rings 47 that seal against the surface 42. The upper surface of the flange 46 engages a downwardly facing shoulder 48 on the body 20 and is held against the same by a lock nut 49 to fix the sleeve 40 axially within the body 20. The upper end surface 50 of the sleeve 40 is spaced downwardly of an adjacent shoulder 51 on the body 20 and not in contact therewith. A transverse tube 53 is formed integrally with the sleeve 40 intermediate the ends thereof and is arranged so as to receive the first-mentioned tube 33 which extends therethrough. The outer periphery of the sleeve 40 is spaced laterally inwardly of the adjacent inner wall surface of the body 20 throughout substantially all of the length of the sleeve to provide an annular cavity 54 which is filled with oil or other essentially noncompressible liquid via a typical fill plug (not shown).

The pressure of the oil in the cavity 54 is equalized with the pressure of well fluids on the outside of the body 20 by a pressure transmitting piston 55 shown in FIG. 3. The piston 55 is slidably received in a radially directed cylinder 56 formed in the wall of the body 20 and has O-ring seals 57 in sliding engagement therewith. The inner end of the cylinder 56 is communicated with the annular cavity 54 by a port 58, whereas the outer end of the cylinder is open to the outside of the body 20. A stop ring 59 is provided to retain the piston within the cylinder 56.

A set of transducers such as resistance strain gauges are fixed by suitable means to the wall surfaces 26 of the holes 25 adjacent the annular region 36, and thus are mounted in a protected manner in an atmospheric environment. For measuring strain in the walls of the holes 25 indicative of axial compression loading of the body and thus WOB, preferably four gauges are arranged in each hole as shown in FIG. 5, with gauges 62 and 63 at the respective top and bottom surfaces of the hole, and gauges 64 and 65 at the respective light and left-hand sides thereof. Each set of gauges is utilized in a resistance bridge network of a general design familiar to those skilled in the art. The electrical leads to the network are brought through appropriate sealed connectors (not shown) to the outside where the wires extend upwardly in grooves 70 (FIG. 2) formed in the outside of the body 20 and are protected by cover plates 71 or the like. Other means for bringing the signal to the outside may, of course, by used.

To measure torque, another set of resistance strain gauges may be fixed to the wall of each aperture 25, but angularly offset by 45° to the orientation of the set illustrated in FIG. 5 that are used to measure weight. Torsional forces applied to body 20 to cause the bit 12 to turn result in ovalization of the aperture with the principal axis at about 45° to the longitudinal axis on the body, and the corresponding strain evidenced in the walls of the aperture is measured by the gauges as an indication thereof. Although the gauges for measuring torque could in principle be fixed in the same apertures as those employed to measure compression loading, it may be preferable to provide another cross tube, plug and radial hole assembly identical to that shown in FIG. 2 but spaced downwardly thereof. The additional assembly could, if desired, be oriented at 90° with respect to the upper assembly. Except for the angular orientation of the set of gauges within the holes 25, however, the apparatus otherwise would be identical to that described above and thus need not be illustrated herein.

OPERATION

In operation, the sub 20 assembled as shown in the drawings is connected in the drill string above the bit 12 and the electrical leads to the transducer are coupled with leads to the transmitter 15 in a known manner. The annular cavity 54 will have been previously filled with oil, and as the drill string is run into the wall, the pressure of the oil in the cavity is equalized with that externally of the body 20 by the piston 55. When the mud pumps are started up at the surface to initiate circulation, the pressure of the mud inside the sleeve 40 will be higher than the pressure in the annulus outside by an amount equal to the pressure drop across the nozzles of the bit 12. Hoop stresses due to this pressure difference are induced in the sleeve 40 but are substantially isolated from the major portion of the length of the body 20 because of the equalization of pressures by the piston 55 as previously mentioned. Any stresses due to shortening of the sleeve caused by a Poisson effect also are not transmitted to the body 20, since the upper end portion 43 of the sleeve is free to move downwardly. Tensile stress in the body 20 due to pressure drop across the bit is substantially offset by upward force on the shoulder 48 of the body caused by the pressure difference acting on a resultant area of the sleeve 40 which is equal to the difference in the areas bounded by the seal rings 47 and 41. Thus, the entire central region of the body 20 where the holes 25 and the strain gauges are located is effectively isolated from pressure gradients which would otherwise have a deleterious influence on the readings obtained from the transducers. The gauges 62-65 preferably are located as shown in FIG. 4 at or near the midpoint of the cross-sectional wall thickness of the body 40 so as to be substantially unaffected by any temperature gradient that may exist in the metal.

The inwardly directed force on each of the plugs 29 due to external or hydrostatic pressure is supported by the tube 33 having its end surfaces in abutment with the inner walls of the plugs, whereby there are no concentrated stresses in the walls of the body 20 adjacent the holes due to external pressure acting on the plugs 29. The same pressure in the annular cavity 54 acts on the annular sections of the body adjacent the inner surfaces 27 of the holes; however, such stresses are uniformly distributed therearound and thus do not affect the output of the set of strain gauges which are fixed at regular spacings around the wall surface 32 and on the same radius. So arranged, the gauges are not subjected to extraneous strains that would otherwise mask the strain due to axial and/or torsional loading that it is desired to measure.

When the body 20 is subjected to axial loading during the drilling operation, the radial holes 25 will assume a slightly elliptical or oval configuration and the upper and lower gauges 62-63 will sense tension-induced strain while the side gauges 64-65 will sense compression-induced strain. As will be recognized by those skilled in the art, a measure of the resistance change of the gauges can be translated into a measure of the axial force applied to the body 20. Four gauges are, of course, connected in a bridge circuit such that the temperature effects cancel out.

It now will be recognized by those skilled in the art that a new and improved apparatus has been provided for use in measuring WOB and/or torque during the drilling operation. The apparatus also can be used to measure lateral forces on the bit to predict probable borehole direction in the manner disclosed and claimed in application Ser. No. 29,423, filed Apr. 22, 1979, now U.S. Pat. No. 4,303,994 and assigned to the assignee of this invention. The measurements are made with high accuracy due to the fact that the strain gauge transducers are located on the member which bears the stresses due to weight or torque, rather than on an auxiliary member or sleeve used in the past to amplify the strain. All the gauges are located in close proximity to one another, and in a manner such that temperature gradients in the metal will have minimal effects. The gauges also are positioned in an atmospheric chamber for increased reliability. The overall construction of the apparatus is such that the measurements are substantially insensitive to stresses caused by ambient pressures and temperatures and differential pressures. Although in principle a single hole could be used to measure WOB or torsional forces, the use of oppositely directed holes provides a means of bending compensation.

Since certain changes or modifications may be made by those skilled in the art without departing from the inventive conceps involved, it is the aim of the appended claims to cover all such changes and modifications falling within the true spirit and scope of the invention.

What is claimed is:

1. Apparatus adapted for use in measuring forces applied to a drill bit during the drilling of a well, comprising:
    a tubular body adapted to be connected in a drilling string above the bit and having means defining a radially directed opening in a wall thereof;
    means for isolating peripheral wall surfaces of said opening from ambient well fluids and for substantially eliminating regions of stress concentration in said body in the vicinity of said opening resulting from pressures of said ambient well fluids; and
    sensor means attached to said wall surfaces for providing an output indicative of a change in the shape of said opening due to forces applied to said body.

2. The apparatus of claim 1, wherein said sensor means are attached to said wall surfaces substantially at the midpoint of the sectional thickness of the wall of said body.

3. The apparatus of claim 1, wherein said isolating and substantially eliminating means includes sleeve means sealingly mounted inside said body and extending above and below said opening, said sleeve means and body defining an annular region therebetween; and means for applying the pressure of fluid outside said body to said region.

4. The apparatus of claim 3, wherein one end of said sleeve means is fixed against movement relative to said body and the other end thereof is free to move relative to said body.

5. The apparatus of claim 4, wherein said one end of said sleeve means is the lower end thereof and has a larger area of sealing engagement with said body than the other end thereof.

6. The apparatus of claim 1, wherein said isolating and substantially eliminating means includes plug means sealingly closing the outer opening of said opening, and means independent of said body for supporting said plug means against radial inward movement due to well pressure.

7. Apparatus adapted for use in measuring forces applied to a drill bit during the drilling of a well, comprising:
    a tubular body adapted to be connected in a drill string above the bit and having a radially directed circular hole extending through the wall thereof;
    plug means for sealingly closing the external opening of said hole;

support means sealingly closing the interior opening of said hole and engaging said plug means to prevent inward movement thereof due to well pressure;

said plug means and support means providing an atmosphere chamber within said hole; and sensor means attached to peripheral wall surfaces of said hole within said chamber and adapted to detect strain due to application of forces to said body.

8. The apparatus of claim 7, wherein said sensor means are attached to said well surfaces substantially at the midpoint of the sectional thickness of the wall of said body.

9. The apparatus of claim 7, further including a sleeve member mounted in the bore of said body and having its opposite ends sealed with respective thereto, said sleeve member and body defining an annular fluid-filled region therebetween; and means for equalizing the pressure of fluid externally of said body with the pressure of fluid filling said region.

10. The apparatus of claim 9, wherein the lower end of said sleeve member has a larger diameter of sealing engagement with said body than the upper end thereof, whereby a greater fluid pressure within the bore of said sleeve member and body than the pressure in said region exerts upward force on said sleeve member; and means for transferring said force to said body.

11. Apparatus adapted for use in measuring forces applied to a drill bit during the drilling of a well, comprising:

a tubular body member having diametrically opposed, radially directed holes through the wall thereof;

closure means sealingly closing the outer openings of said holes;

a support member extending across the bore of said body member and abutting said closure means to prevent radial inward movement thereof due to well pressure, said support means being sealed with respect to said body member and providing together with said closure means an atmospheric chamber within said holes; and sensor means attached to the walls of said holes within said chamber and adapted to detect strain due to application of forces to said body member.

12. The apparatus of claim 11, wherein said sensor means are located on said wall surfaces at approximately the midpoint of the sectional wall thickness of said body member so as to be substantially insensitive to stresses induced in said body member by temperature changes.

13. The apparatus of claim 11, further including a sleeve member mounted inside said body member and spanning said holes, said sleeve member having its opposite end sealed with respect to inner wall surfaces of said body member and its outer wall surface laterally spaced from the adjacent inner wall surface of said body member to define therebetween an annular fluid-filled cavity; and means for transmitting the pressure of fluids outside said body member to said cavity to equalize pressures across the wall of said body member in the region of said holes.

14. The apparatus of claim 13, wherein one end of said sleeve member is fixed to said body member and the other end thereof is free to move relative to said body member.

15. The apparatus of claim 14, wherein said one end of said sleeve member is the lower end thereof, said lower end having a larger diameter in sealing engagement with said body member than the other end thereof so that a difference in the pressure of fluids inside said sleeve member and in said annular cavity acts as an upward force on said body member.

16. The apparatus of claim 15, further including a tube extending transversely of said sleeve member, with said support member extending through the bore of said tube.

17. Apparatus adapted for use in measuring forces applied to a drill bit during the drilling of a well comprising:

a tubular body adapted to be connected in a drill string above the bit and having a radially directed bore extending through the wall thereof, said bore having an outer portion and an inner portion;

plug means sealing receiving in said outer portion of said bore for closing the same against entry of well fluids from externally of said body;

support means extending through said inner bore portion and being sealed with respect thereto to prevent entry of fluid from the interior of said body, said support member having an end surface abutting said plug means to prevent inward movement thereof, said plug means, outer bore portion and support means defining an enclosed atmospheric chamber; and sensor means attached to peripheral wall surfaces of said outer bore portion in said chamber for detecting strain due to application of forces to said body.

18. The apparatus of claim 17, wherein said outer portion of said bore has a greater diameter than said inner portion of said bore, said atmospheric chamber being defined in part by an annular region externally of said support member.

19. The apparatus of claim 17 wherein said support means is tubular so that the hollow interior thereof provides space for the location of circuit means associated with said sensor means.

20. Measuring apparatus comprising:

a tubular member adapted to be connected to a drill bit and having a radially directed aperture in the wall thereof;

means for isolating the peripheral side wall surfaces of said aperture from the effects of ambient well fluids;

means for detecting ovalization of said aperture caused by force applied to said member and to the bit, and for providing an output indicating thereof; and means for transmitting to the surface of a borehole during drilling a signal having a predetermined relation to said output.

* * * * *